United States Patent
Singh et al.

(10) Patent No.: US 12,373,839 B2
(45) Date of Patent: Jul. 29, 2025

(54) CONTROLLING ATM SURFACE ATTACKS LEVERAGING DECENTRALIZED SWARM INTELLIGENCE USING ATMS

(71) Applicant: Bank of America Corporation, Charlotte, NC (US)

(72) Inventors: Shailendra Singh, Maharashtra (IN); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 355 days.

(21) Appl. No.: 18/115,858

(22) Filed: Mar. 1, 2023

(65) Prior Publication Data

US 2024/0296453 A1 Sep. 5, 2024

(51) Int. Cl.
*G06Q 20/40* (2012.01)
*G06Q 20/10* (2012.01)
*G06Q 20/38* (2012.01)

(52) U.S. Cl.
CPC ..... *G06Q 20/4016* (2013.01); *G06Q 20/1085* (2013.01); *G06Q 20/389* (2013.01)

(58) Field of Classification Search
CPC ........... G06Q 20/4016; G06Q 20/1085; G06Q 20/389; G06F 19/20; G06F 19/207; G06F 19/211
See application file for complete search history.

(56) References Cited

U.S. PATENT DOCUMENTS

| | | | |
|---|---|---|---|
| 7,980,462 B1 * | 7/2011 | Graef | G06Q 20/382 |
| | | | 235/487 |
| 11,610,205 B1 * | 3/2023 | Fain | G06Q 20/1085 |

* cited by examiner

*Primary Examiner* — Laura A Gudorf
(74) *Attorney, Agent, or Firm* — Weiss & Arons LLP

(57) ABSTRACT

A decentralized swarm intelligence algorithm over a network of paired ATMs to prevent or control surface attacks on ATMs. The ATMs may be seeded with an initial swarm intelligence model to identify suspicious activity. An ATM may relay alerts about suspicious activity at that ATM to other paired ATMs. The ATMs use machine learning to update the model and perform swarm intelligence autonomously at the paired ATMs. A bank may provide the initial swarm intelligence model, receive alerts about and analyze the attacks, and provide updated swarm intelligence models to prevent or limit future attacks. Smart contracts may be used to specify rules for performing swarm intelligence using the paired ATMs. Records regarding swarm intelligence models, attempted suspicious attacks including payment instruments that may have been used, actions taken in response to the attacks, and smart contracts may be recorded on a blockchain distributed ledger.

23 Claims, 8 Drawing Sheets

CONTROLLING ATM SURFACE ATTACKS LEVERAGING DECENTRALIZED SWARM INTELLIGENCE USING ATMS

FIELD OF THE DISCLOSURE

Aspects of the disclosure relate to using automated teller machines (ATMs) as distributed nodes for performing decentralized swarm intelligence to detect and control surface attacks at the ATMs.

BACKGROUND OF THE DISCLOSURE

ATMs are evolving so that an increasing number of external payment instruments, other than a traditional bank card, may be used to access and perform banking functions using an ATM. These include payment instruments like smart cards (having a built-in chip), mobile devices, smart glasses, IoT (Internet of Things) devices, and other devices to perform transactions at the ATM. By enabling these payment instruments to access and interact with an ATM, the ATM becomes more vulnerable to a malicious attack. An attacker may acquire unauthorized access to the ATM and may exploit this access to gain control over the ATM and possibly even other ATMs in the network. The sum of the different possible points of attack is called the attack surface. As the size of the surface for potential attacks increases, each ATM becomes more vulnerable. This may lead to an expansion of attacks on an ATM. The effect of an attack may vary from a minor disruption to a larger disruption in ATM operations.

SUMMARY OF THE DISCLOSURE

It is an object of this invention to prevent or limit disruption from malicious attacks on an ATM by detecting and addressing the attacks and alerting other ATMs of the attacks as quickly as possible.

A method in accordance with principles of the disclosure may control access to an ATM upon detection of a suspicious payment instrument. The detection of a suspicious payment instrument may indicate an attempt for a malicious intrusion at the ATM, such as by hackers.

The method may include pairing a first ATM with a plurality of other ATMs to form a network of paired ATMs. The paired ATMs may be located within a geofenced area. The paired ATMs may perform banking transactions and serve as distributed nodes for performing a swarm intelligence algorithm. The paired ATMs may be accessible using one or more payment instruments that are external to the ATMs.

The method may further include receiving, at the first ATM, an initial swarm intelligence model for performing the swarm intelligence algorithm on the network of paired ATMs, detecting, by the first ATM, one of the one or more payment instruments used by a user to access the first ATM and capturing information about the payment instrument, and determining, by the first ATM, whether the detected payment instrument of the user is suspicious based on the initial swarm intelligence model and the captured information. The initial swarm intelligence model may provide the rules for determining whether the one or more payment instruments are suspicious and the actions that may be taken if the payment instruments are deemed to be suspicious.

Interaction by the payment instrument with the ATM may be allowed when the payment instrument is not determined to be suspicious. However, when the detected payment instrument of the user is determined to be suspicious, the first ATM may execute an action to control access, by the payment instrument that is determined to be suspicious, to the first ATM, relay an alert to the plurality of other ATMs about the suspicious payment instrument, and update the initial swarm intelligence model to an updated swarm intelligence model that accounts for the determination that the payment instrument is suspicious.

The execution of an action to control access to the first ATM may include, for example, one or more of preventing or limiting access to the first ATM, preventing or limiting the requested banking transaction, or requiring an additional step to be performed before executing the requested banking transaction. The execution of an action to control access to the first ATM may include one or more of blocking a user of the suspicious payment instrument, blocking all users of a same type of payment instrument as the suspicious payment instrument, requiring an increased authentication or verification of the suspicious payment instrument before use, limiting an amount or type of a transaction that may be performed by the suspicious payment instrument at the ATM, or placing the user of the suspicious payment instrument on a blacklist. The method may further include quarantining the ATM upon detection of access to the ATM by the suspicious payment instrument or upon detection of an actual malicious attack by the suspicious payment instrument.

The relaying of the alert to the plurality of other ATMs may be performed by the first ATM using ant colony optimization (ACO). The relay may be performed by a dynamic local cache at the first ATM.

The method may further include receiving, at the plurality of other ATMs, copies of the initial swarm intelligence model, and updating the initial swarm intelligence model at one or more of the plurality of other ATMs in the network of paired ATMs upon receiving the alert from the first ATM. The method may further include transmitting the captured information about the payment instrument about the detection of the suspicious payment instrument to a fraud incident database in communication with the paired ATMs to update the fraud incident database. The method may further include analyzing, using a neural network, the detected suspicious payment instrument to ascertain any vulnerability of the first ATM to the suspicious payment instrument.

The paired ATMs may be configured to wirelessly communicate with one another over one or more wireless communications networks, and the relaying of the alert to the plurality of other ATMs may be performed over the one or more wireless communications networks.

Each of the paired ATMs may be a blockchain node and the method may further include updating a distributed ledger upon detection of a suspicious payment instrument received at the first ATM. The distributed ledger may include one or more smart contracts that may include rules for one or more of pairing ATMs, performing swarm intelligence using the paired ATMs, updating the swarm intelligence model at each of the paired ATM, transmitting updates of the swarm intelligence model to the fraud incident database, relaying alerts to the paired ATMs, or interacting with a bank. Each of the paired ATMs, including the ATM and the plurality of other ATMs, may be an edge in an edge network.

The method may also synchronize, by the ATM, the updated swarm intelligence model with a version of a swarm intelligence model for the paired ATMs that is maintained at a fraud incident database and is in communication with the paired ATMs.

A system in accordance with principles of the disclosure may include a plurality of automated teller machines (ATMs) that perform banking transactions and collectively control attacks on the ATMs. The ATMs may be paired to serve as distributed nodes for collectively performing a swarm intelligence algorithm for collecting and sharing information about suspicious payment instruments that have attempted to access the ATMs. Each of the ATMs may include an interface for a payment instrument to access the respective ATM for performing a banking transaction, a memory for storing an initial swarm intelligence model for performing the swarm intelligence algorithm at the respective ATM, and a processor. The payment instruments may be external to the ATMs. The processor may be configured to detect, by the respective ATM, a payment instrument used, by one of the users, to access the ATM, capture information about the payment instrument, and determine, by the respective ATM, whether the payment instrument is suspicious based on the initial swarm intelligence model. The processor may be configured to allow the respective ATM to interact with the payment instrument when the payment instrument is not determined to be suspicious. When the detected payment instrument is determined to be suspicious, the processor may be configured for the respective ATM to execute an action to control access by the payment instrument that is determined to be suspicious to the respective ATM, relay an alert to the plurality of other ATMs about the suspicious payment instrument, and update the initial swarm intelligence model to account for a determination that the payment instrument is suspicious. The alert may include some or all of the captured information about the payment instrument.

The ATM may include a dynamic local cache for relaying alerts in real time to other ATMs in the plurality of ATMs. The processor of each of the ATMs may be configured to relay real-time alerts based on an ant colony optimization. Each of the ATMs may include a wireless communications transceiver to communicate with one another wirelessly. This may allow the ATMs to rapidly relay any alerts.

Each of the ATMs may operate as a blockchain node, and the ATMs may use a distributed ledger to capture a record of interactions between the ATMs.

The system may include a fraud incident database in communication with the ATMs that may be synchronized, in real time or periodically, with the swarm intelligence algorithm operating on the ATMs. The system may include a neural network in communication with the ATMs to analyze the suspicious payment instruments that are received at the ATMs and ascertain possible vulnerabilities. The system may include one or more modules that are configured to perform one or more of initiating the pairing of the ATMs, generating the initial swarm intelligence model, monitoring the operations of the ATMs, validating payment instruments, orchestrating a decentralized control of respective local caches at each of the ATMs to detect fraud, controlling the relay of alerts by the respective local caches to use ant colony optimization for distribution of the alerts, generating and modifying smart contracts that control operations of the swarm intelligence algorithm, or orchestrating rules to be used at the plurality of ATMs.

A method for controlling access to an automated teller machine (ATM) upon detection of a suspicious payment instrument, may include implementing a swarm intelligence algorithm on a network of ATMs, wherein the ATMs may serve as distributed nodes for performing the swarm intelligence algorithm, wherein each of the ATMs may be accessed using one or more payment instruments that are external to the ATMs, and wherein each of the ATMs may receive an initial swarm intelligence model for performing the swarm intelligence algorithm. The method may further include detecting, by a first ATM of the network of ATMs, one of the one or more payment instruments used by a user to access the first ATM and capturing information about the payment instrument, determining, by the first ATM, whether the detected payment instrument of the user is suspicious based on the initial swarm intelligence model and the captured information, and allowing, by the first ATM, interaction with the payment instrument when the payment instrument is not determined to be suspicious. The method may further include, when the detected payment instrument of the user is determined to be suspicious, executing, by the first ATM, an action to control access to the first ATM, relaying, by the first ATM, an alert about the suspicious payment instrument to other ATMs in the network of ATMs, wherein the alert may include captured information about the payment instrument; and updating, at the first ATM, the initial swarm intelligence model to an updated swarm intelligence model that accounts for the determination that the payment instrument is suspicious.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
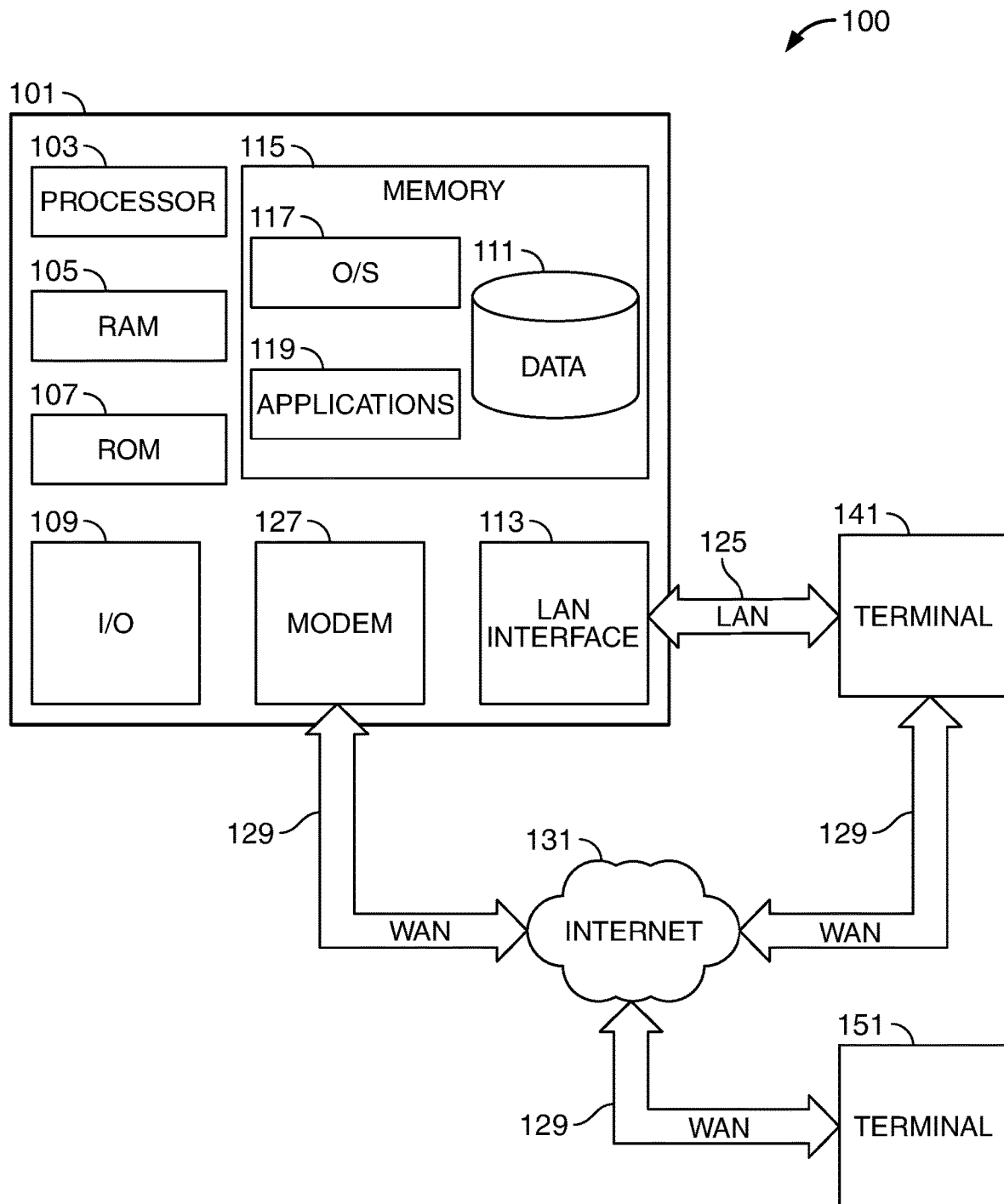
FIG. 1 shows an illustrative system architecture in accordance with principles of the disclosure.

The present disclosure relates to improving the security of ATMs that provide access to the ATMs via various types of payment instruments (payment devices) that are external to the ATMs. Examples of external payment instruments include smart cards (e.g., a bank card or credit card having a chip), mobile devices, such as, for example, a mobile phone or tablet, smart glasses, and Internet of Things (IOT) devices, to name a few. The ATMs may be vulnerable to malicious attacks from some of these payment instruments. The attacks may be the result of intentional attacks by some users of the payment instruments or may be inadvertent, as where the software on the payment instruments has been compromised. A security breach at one or more ATMs may enable fraud and may also damage the ATMs or the network on which they operate. Each type of payment instrument that is allowed to access the ATM increases the size of the surface that may be attacked at the ATM.

A system and method are described for intelligently detecting suspicious payment instruments and preventing or limiting access of such instruments to the ATMs to control attempted malicious attacks on the ATMs through the implementation of a swarm intelligence algorithm at the ATMs. The ATMs may be configured to create a local network by pairing multiple ATMs, which may be geographically distributed. The local network may be geofenced (geographically fenced) so that any attempt at mass fraudulent activity is limited. Each paired ATM may be provided with a swarm intelligence model for machine learning. The model, which may be referred to as a decentralized swarm intelligence fraud model (DSIFM), may be a distributed and decentralized model in which the swarm intelligence may be collectively performed by the ATMs, such as without a bank server. Each ATM in the network may be considered as a distributed node that participates in performing swarm intelligence within a swarm intelligence network of ATMs.

An initial version of the swarm intelligence model (a "base model" or "seed version") may be generated by a central entity, such as a bank associated with the ATMs, and may then be distributed to and deployed at multiple ATMs. The base model may include at each ATM a dynamic self-learning and adopting capability that allows for the model to continuously learn and improve the algorithm and model based on interactions between the respective ATM and the external payment instruments. The base model that is distributed may differ based on the geographical area. The base model may have different predefined rules for different vulnerabilities.

The predefined rules of the model may be updated dynamically in real time to improve ATM safety based on newly detected vulnerabilities which may be detected, for example, by detection of a local attack at the ATM or attacks at other ATMs. ATMs that are newly added may receive updated models derived from the ATMs at which swarm intelligence model has been previously deployed.

The model may be blockchain-based. A distributed ledger for the blockchain may be used to monitor usage of the ATMs, including suspicious activity and any attacks. The distributed ledger may also be used to maintain smart contracts to manage interactions between the ATMs and between the ATMs and the central entity.

Each ATM may be provided with a local cache, which may be a dynamic local cache, and wireless communications capability from which to quickly relay detected suspicious activity, including anomalies detected at an ATM, to one another. The ATMs may function as edges in an edge network and nodes on a blockchain. By placing the computing operations near the users, the swarm intelligence may access and analyze the data more quickly and reliably. The machine learning algorithm may be updated based on the detected suspicious activity and may be synchronized to update machine learning algorithms at the other ATMs and at a fraud incident database. The fraud incident database may be operated by the central entity. The communication of swarm intelligence between the ATMs in a local network and between the bank and ATMs in the local network may take place over a wireless communications network, such as a 5G or 6G mobile communications network, for a fast exchange of information. The algorithm enables the ATM to act as an Edge device which detects an "ATM-device"-related anomaly and to develop or enhance its own fraud prevention algorithms based on swarm intelligence in a local distributed ATM network.

The swarm intelligence model may control the local cache, rather than a bank server(s), to trigger measures that may prevent or control an attack. When an anomaly is detected at the ATM using the swarm intelligence algorithm, the responsive action may include relaying alerts in real time to other ATMs based on collective intelligence over ATMs spread across different geographic (geo) locations, such as via the local cache. The alerts may be relayed according to a randomized, probabilistic algorithm based on the swarm intelligence. The randomized algorithm may be, for example, an ant colony optimization (ACO) or some other swarm intelligence technique. The ACO probabilistic technique is useful in problems that deal with finding better paths through a graph. The ACO-based mechanism may provide relay information in the optimal routing path (fastest) within the geofenced, network connected ATMs so that the ATMs may act in a group. The ATMs may be configured to share minimal critical information to be able to limit the amount of data shared for security reasons.

Another use of the local cache is for assessing each attempted transaction with an external payment instrument for vulnerability and assigning a score in the local cache to the attempted transaction. If any system is compromised, the intelligence of swarming artificial intelligence (AI) and machine learning, may take the engine offline and cut off the ATM from the network. The ATM may try to self-heal before rejoining the network.

Responses to an anomaly detected by the swarm intelligence algorithm may include taking one or more preventative actions, such as, for example, taking the ATM offline, preventing the future use of certain devices or cards or types of devices by adding them to a list of blacklisted devices or cards, or by requiring an additional step to be performed before executing the requested banking transaction, such as requiring users of certain devices or cards to perform an increased level of validation before they could use the ATM. A hash index-based database may act as a system of record (SOR) for blacklisted devices, cards, etc. and may act as a feed for a randomized algorithm.

Other examples of possible responses to an anomaly may include preventing or limiting access to the first ATM, preventing or limiting the requested banking transaction, blocking a user of the suspicious payment instrument, blocking all users of a same type of payment instrument as the suspicious payment instrument, requiring an increased authentication or verification of the suspicious payment instrument before use, limiting an amount or type of a transaction that may be performed by the suspicious payment instrument at the ATM, placing the user of the suspicious payment instrument on a blacklist, or quarantining the ATM upon detection of access to the ATM by the suspicious payment instrument or upon detection of an actual malicious attack by the suspicious payment instrument.

The swarm intelligence algorithms that are developed at the ATMs may thus serve as fraud prevention algorithms.

The algorithms may evolve based on swarm intelligence in the distributed ATMs of the local network. The algorithms may be synchronized at regular intervals with a central fraud monitoring system, such as at a bank server, based on a Smart Contract that may be established between the bank and ATM networks.

One or more dynamic smart contracts may be generated upon each learning interaction. The dynamic smart contract which is generated may be triggered by an ATM or by the central entity and may provide instructions (rules) for the operation of the ATMs and interactions between the ATMs and the central entity. This may include rules on how to validate the pairing of the ATM with a smart device at any point in time. The dynamic smart contract may define payment orchestration and trigger how and when the multi-layered authentication shield on ATMs in geographically distributed locations and connected over the network should be activated. The dynamic smart contract may also control when the swarm intelligence model and parameters are to be sent to the central network, e.g., the bank network.

As one example of how the system and method may be used to detect fraud, a particular smart phone may have a version of an operating system on it. The ATM may capture the smart phone information (e.g., manufacturer, operating system, programs on device, or other features.) If a fraudulent action has been attempted by that smart phone, the ATM may discover that it has a vulnerability. The ATM may alert the other ATMs and may take measures to address the issue. For example, if that phone is used again at the ATM or others in the local network, the transactions may be blocked. If a similar phone is used at the ATM in the future, additional validation requirements, such as an additional authentication, may be required.

The system and method may prevent and control surface attacks associated with external instrument interaction with ATM completely in an autonomous way in scenarios where ATMs become disconnected from bank network. Moreover, the method may keep track of suspicious payment device interaction with ATM and alert and deploy controls on ATMs via swarm intelligence.

A single entity, like a bank, may deploy the decentralized swarm intelligence for its own ATMs, or multiple entities, such as multiple banks, may collaborate as a central entity in deploying the decentralized swarm intelligence over ATMs from multiple entities. In this case, rules in the dynamic smart contracts for the ATMs may differ by differ by bank.

When activated, such as due to an ATM being comprised or the ATM being separated from the central network, an authentication shield may limit access to the ATM by requiring an authentication or an elevated level of authentication. The activation of the authentication shield may be relayed to other ATMs.

The compiled swarm intelligence and records of fraud and vulnerabilities may be shared outside of the local network, such as to a nationwide network.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The computer program products, methods, systems, and apparatus described herein are illustrative. The computer program products, methods, systems, and apparatus of the invention may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
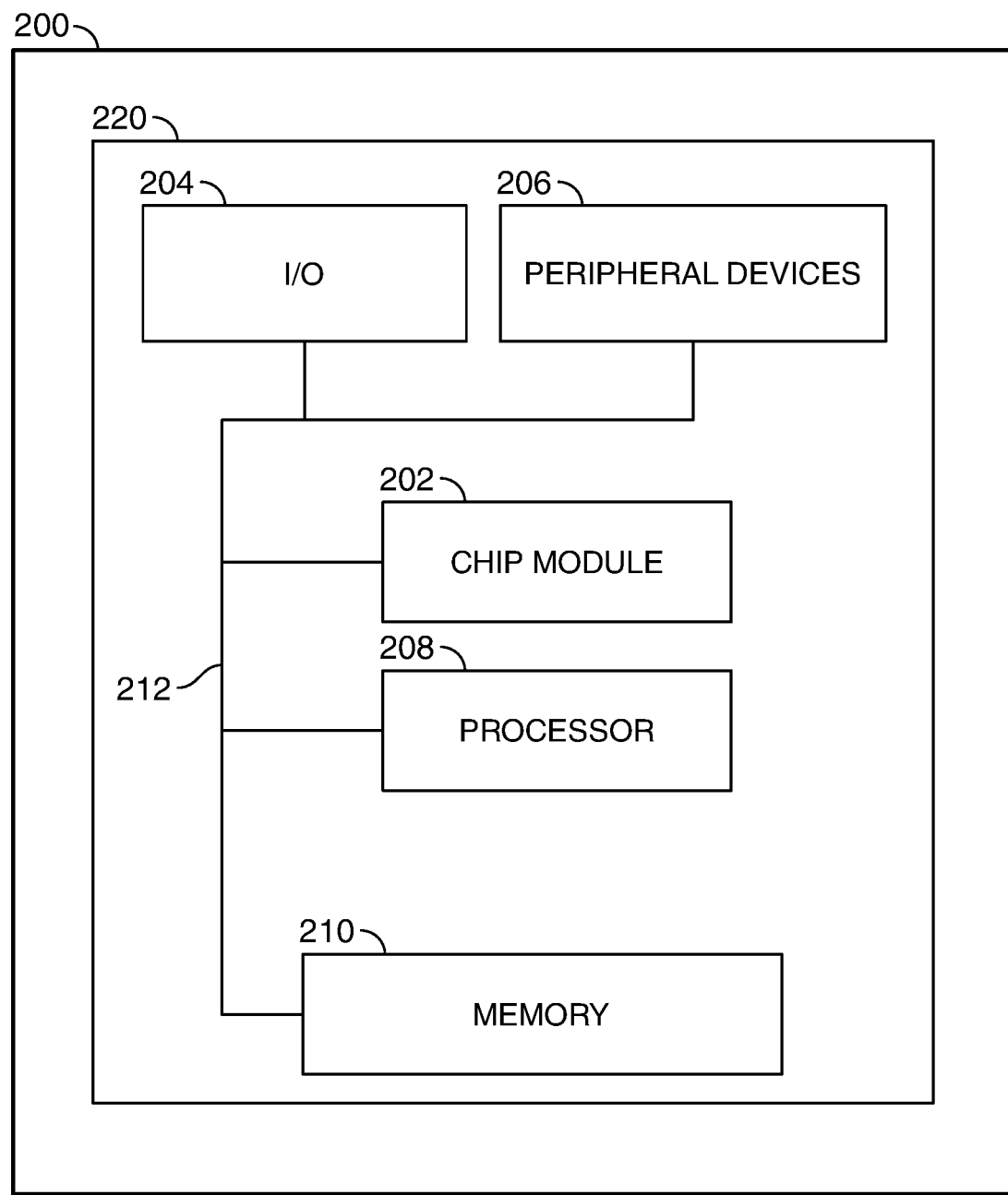
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
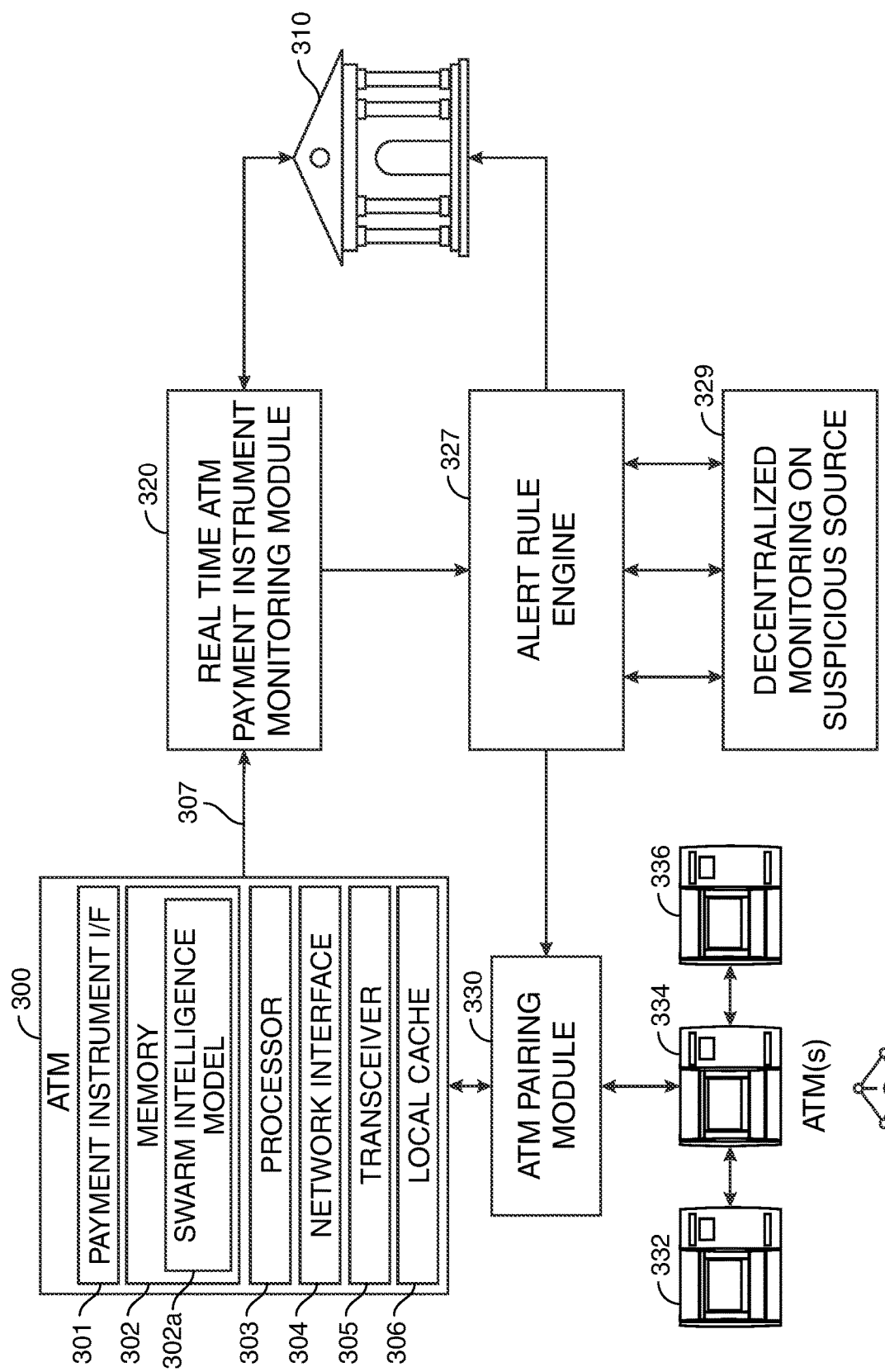
FIG. 3 shows an illustrative example of a decentralized payment instrument monitoring system for monitoring suspicious activity at multiple paired ATMs in accordance with principles of the disclosure.

FIG. 3 shows an illustrative example of a decentralized payment instrument monitoring system for monitoring suspicious activity at multiple paired ATMs.

ATM 300 may be paired with other ATMs using an ATM pairing module 330 so that the ATMs may communicate with one another as a local private shared network of ATMs. Communications among the paired ATMs may be via wired links or via wireless communications. The ATMs may be located geographically apart from one another. An ATM pairing module 330 may use a pairing algorithm to pair the ATMs. In embodiments, the pairing may pair the ATMs over a wireless communications network like a 5G network or a 6G network. In the example illustrated in FIG. 3, ATM 300 is paired with three other ATMs 332, 334, 336. However, any number of ATMs may be paired. The locations of ATMs that are included within a set of paired ATMs may be geofenced, based on an actual or virtual geographic boundary, to include only a limited number of ATMs to limit any malicious attack to a limited number of ATMs and not allow the attack to spread more widely. The paired ATMs may be in communication with one or more bank application servers (not shown) to perform banking transactions.

ATM 300 may include at least one payment instrument interface 301 for the payment instrument to be used to access the ATM to perform banking transactions. The interface 301 may be configured for payment instruments that are external to the ATM to access the ATM. Payment instrument interface 301 may be, for example, a card reader that reads smart cards, or a wireless interface such as a 5G or 6G communications interface, a Wi-Fi interface, a Bluetooth or Zigbee interface, or another interface that may be used to access ATM 300 with a payment instrument, such as a mobile device, smart glasses or an IoT device. ATM 300 may include a memory 302 on which is stored a swarm intelligence model 302a. ATM 300 may further include one or more processors 303 for performing banking transactions, participating in a swarm intelligence algorithm, and for performing machine learning and update the model, a network interface 304 to communicate with one or more bank application servers, a transceiver 305 for wireless communication, and a dynamic local cache 306 that may be used for, among other things, relaying alerts about suspicious instruments and detected attacks to other paired ATMs. ATMs 332, 334, 336 may include the same or similar components to perform banking transactions and a swarm intelligence algorithm.

ATM 300 may capture information about the payment instrument that is used to attempt to access the ATM when the payment instrument attempts to access the ATM, such as by inserting a bank card with a chip or by pairing the payment instrument with the ATM via Bluetooth or Zigbee. Details that may be captured may include one or more of a payment instrument identifier that uniquely identifies the payment instrument being used, the manufacturer of the payment instrument (e.g., a manufacturer of a cell phone), the provider of the payment instrument (e.g., the mobile network used), one or more app(s) on the payment instrument, the geographical location of the ATM, or a date, a time, or a type of suspicious activity. This information may be captured, at least momentarily, to be used to analyze by the ATM, using the swarm intelligence model, whether a particular device, a type of device, or a device having a particular app, may be causing a detected suspicious activity so that action should be taken. Details about the time and location of the suspicious activity may also be captured.

When in communication with bank servers, ATM 300 may transmit the captured information about the payment instrument that has been used over a link 307 to a real time ATM payment instrument monitoring module 320. Module 320 may be decentralized across various ATMs in the local network, or it may be centralized, and may monitor details about external payment instruments that are interacting with an ATM. Module 320 may also have information as to which ATMs are vulnerable to a particular type of attack.

The payment instrument monitoring module 320 may additionally transmit this information to a central entity 310. In embodiments, central entity 310 may be one or more banks 310, may be an ATM vendor for an ATM network, may be a third party that coordinates swarm intelligence functions, or may be operated as a collaboration by more than one entity. Payment instrument monitoring module 320 may notify an alert rule engine 327, which may also be decentralized among the ATMs or centralized, to determine whether the activity that has been monitored warrants sending an alert to the other paired ATMs 332, 334, 336. If an alert is to be sent in accordance with alert rule engine 327, the alert may be sent via ATM pairing module 330 or the alert may be sent directly to the ATMs via a wireless communications network. Alert rule engine 327 may also send an alert to a decentralized monitoring system 329 that operates across ATMs and may be used to monitor suspicious sources as well as details of suspicious activity across ATMs. The decentralized monitoring system 329 may also perform fraud tracking analytics to try to detect the source of the suspicious activity that may lead to fraud.

The information that is compiled from and shared among the ATMs may provide a swarm intelligence to sense and relay alerts and security rules to be followed. The alert rule engine may, in real time or periodically, notify the bank of modifications to the base model made by the ATMs. The bank may update its base model accordingly.

Figure 4:
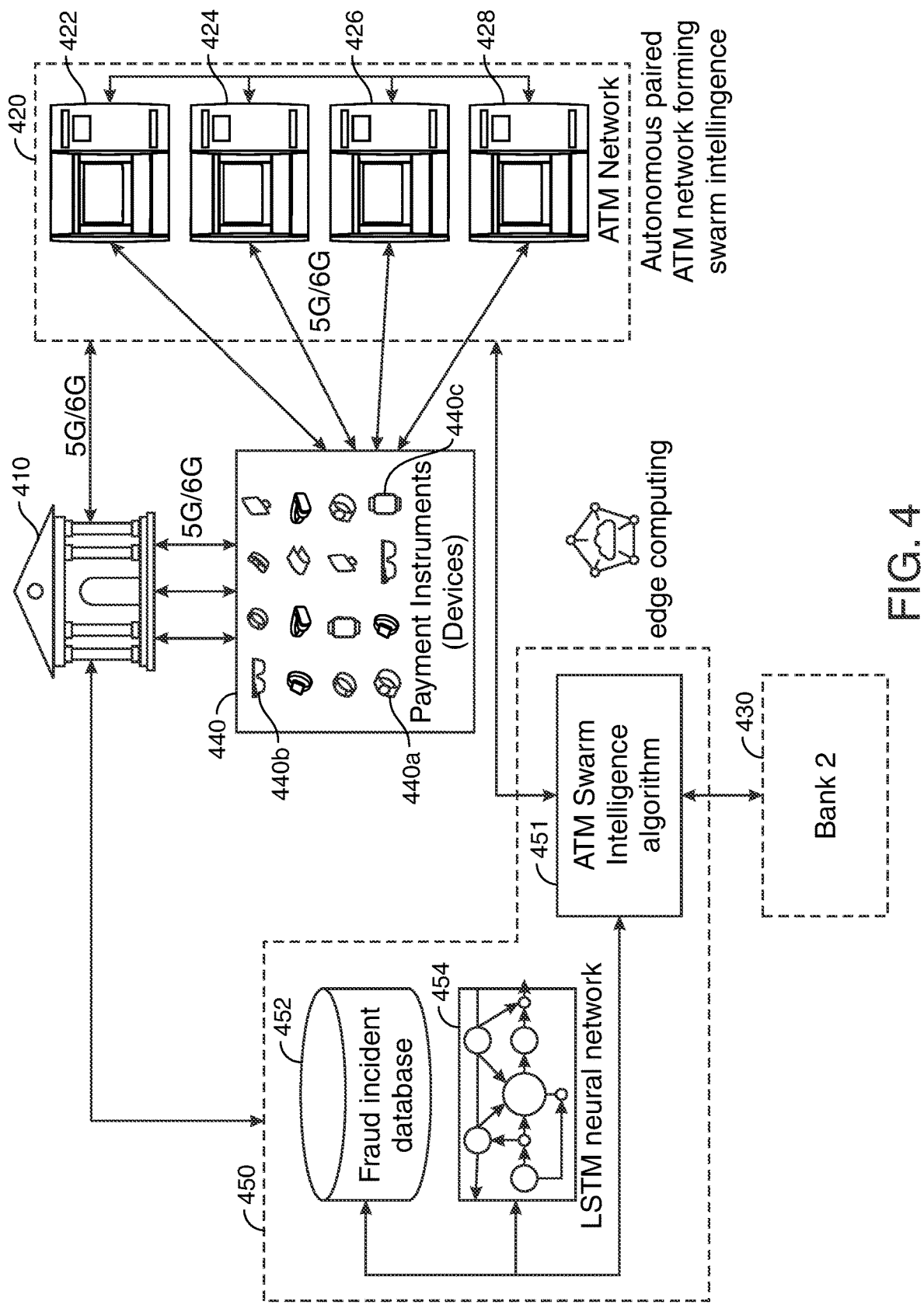
FIG. 4 shows an illustrative example of an ATM-based swarm intelligence system that uses paired ATMs to perform swarm intelligence to detect and address surface attacks on the ATMs and to interact with a central entity to address fraud in accordance with principles of the disclosure.

FIG. 4 shows another example of an ATM network 420 that may function autonomously to perform swarm intelligence to detect and address surface attacks on the ATMs in a paired ATM network. FIG. 4 also shows an illustrative interaction between the paired ATMs and a central entity to address attempted attacks that may involve malicious actions or fraud.

ATM network 420 may include paired ATMs that are communication with a bank 410 over a link such as a wired link (e.g., a wide area network) or a wireless link (e.g., a wireless communications network, such as a 5G or 6G network). The ATMs may also be considered edge nodes. One or more payment instruments 440, such as smart cards, a smart watch 440a, smart glasses 440b, a mobile device 440c, or an IoT device may be used to access one or more of ATMs 422, 424, 426, 428. One or more of payment instruments 440 may also be configured to directly access services at bank 410 such as via an app or a website.

A central entity 450, such as bank 410 or an entity created or authorized by multiple banks, such as banks 410 and 430, may obtain or generate an ATM swarm intelligence algorithm 451 that may be maintained by the central entity 450. An initial swarm intelligence model 451 may be initially provided to the ATMs and may be updated autonomously by the ATMs or in conjunction with the central entity 450. This initial model may be used for machine learning at the ATMs. The base model may be updated at one or more of the ATMs based on new attacks on the ATMs to generate a modified model that may be distributed among the ATMs and to the central entity 450. The model may be updated in real time for each incident. Central entity 450 may further update the model based on information that it may obtain from further analysis of the collected swarm intelligence data and possibly from other sources.

When it is receiving data from the autonomous paired ATM network, central entity 450 may also perform real-time data extraction and fraud monitoring. A record of all suspicious activity detected by the ATMs may be periodically reported or reported in real time by the ATMs to central entity 450 and may be captured in a centralized fraud incident database 452. Central entity 450 may operate a neural network, such as a long short-term memory (LSTM) neural network that be used to further analyze the suspicious activity information, and attempt to determine its source and a manner to control the suspicious activity if it is or may enable malicious or fraudulent activity.

Figure 5:
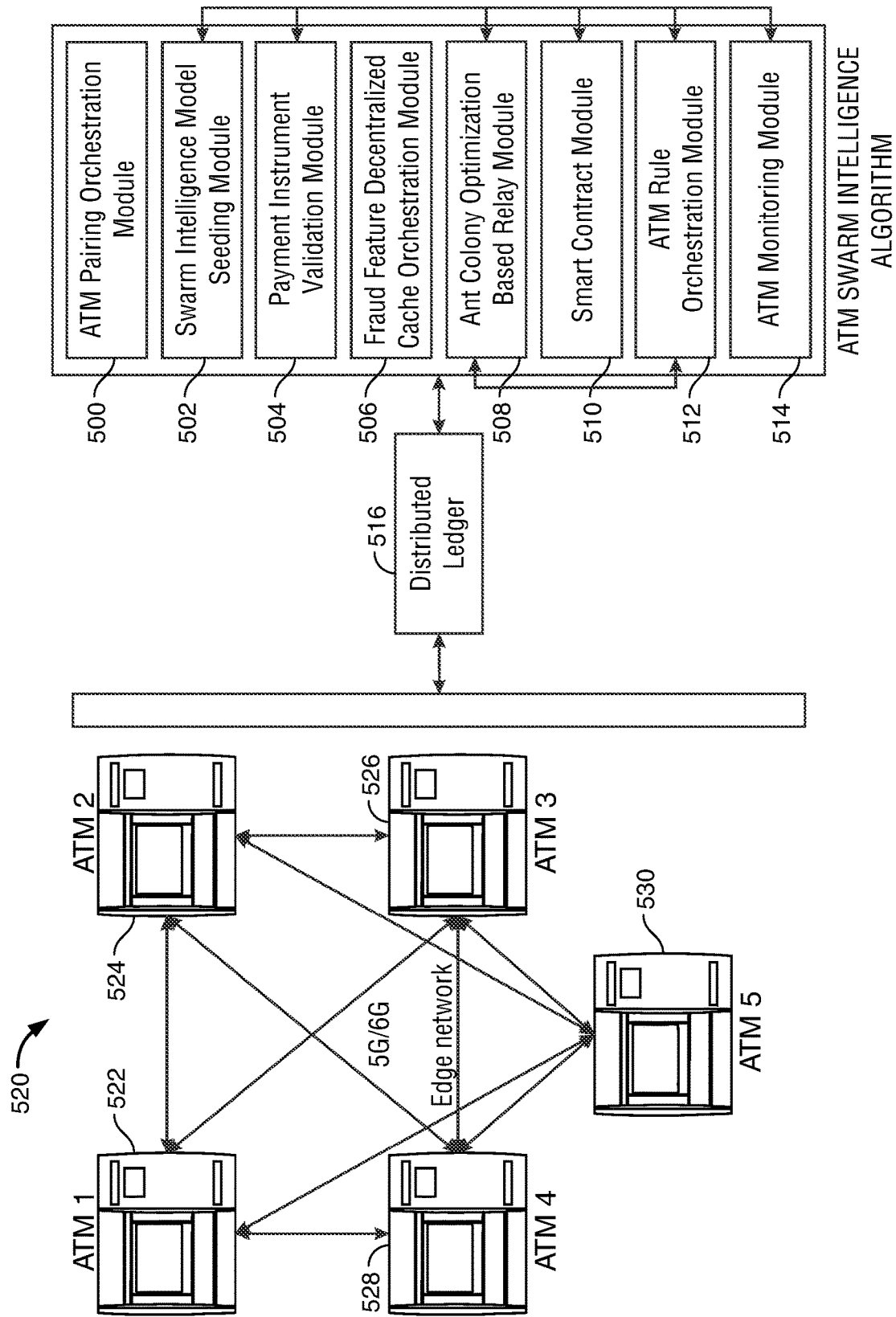
FIG. 5 shows an illustrative system in which interactions between ATMs to perform swarm intelligence and with swarm intelligence-related modules are recorded on a distributed ledger in accordance with principles of the disclosure.

FIG. 5 shows an example of the decentralized swarm intelligence fraud algorithm performed among ATMs. The ATMs may be paired in a local, private shared ATM network. The ATMs in network 520 may communicate with each other and with the bank using distributed ledger technology (blockchain). In this example, five ATMs 522, 524, 526, 528, 530 may be in direct communication with one another for relaying of suspicious activity information between the paired ATMs. ATM network 520 may further interact with software that may be organized into one or more software modules, for example, to perform swarm intelligence using the ATMs 522, 524, 526, 528, 530. An example of modules that may be provided are shown as modules 500, 502, 504, 506, 508, 510, 512, 514.

An ATM pairing orchestration module 500 may be configured to orchestrate the pairing of the ATMs that participate in the swarm intelligence. As an example, the ATMs may be paired by requiring ATM identification numbers that identify particular ATMs and particulars of each ATM that may be needed by the other ATMs to communicate with one another.

A swarm intelligence model seeding module 502 may generate a base model for swarm intelligence that may be provided to each ATM after the ATMs are paired. The base model may be trained to enable the ATM to identify what is considered to be suspicious activity for an initial time period until the ATMs begin to learn to update the model on their own using machine learning upon detection of suspicious activity not targeted by the base model. The model may include, for example, a list of previously identified payment instruments, a type of payment instruments, or apps that have been found to compromise security or may have been used for fraudulent activity. The model may further include information about known security risks for which to check.

A payment instrument validation module 504 may be provided to validate the payment instrument that is being used to access one of the ATMs. The validation process may include requiring a login and password using the payment instrument. The validation may further include checking the payment instrument to determine whether this payment instrument or similar payment instruments or software resident thereon has been identified as suspicious. This determination may be based on the base model resident at the respective ATM for the swarm intelligence model. In validating the payment instrument, module 504 may be used to obtain a payment instrument identifier or other details about the payment instrument, including the hardware and software apps in use, to verify against the model.

A fraud feature decentralized cache orchestration module 506 may be provided to orchestrate detection, by an ATM, of suspicious activity and possible fraud, including suspicious activity which may or may not be identified in the base model. If suspicious activity is detected at a respective ATM, details about the payment instrument may be captured and included in a local cache (e.g., a dynamic local cache) of the ATM and an alert about the detected suspicious activity by the payment instrument may be quickly relayed by the ATM where it was detected to the other paired ATMs using the information in the local cache. One example of an alert relay technique that may be performed to find a quick route for relaying the alert is with the use of an ant colony optimization (ACO) that may be provided by ant colony optimization-based relay module. Another example of a technique that may be used for quickly relaying the alerts for swarm intelligence, is a bee colony optimization.

A smart contract module 510 may be used to generate one or more smart contracts to be used by the ATMs in performing swarm intelligence. Smart contracts that may be generated may include rules for onboarding the ATM to the paired ATMs, rules for pairing the paired ATMs to perform swarm intelligence, rules for performing swarm intelligence, rules for updating the machine learning model and sending updates to the fraud incident database, rules for relaying alerts to the other ATMs, or rules for interacting with vendors that operate one or more of the paired ATMs. These rules may be generated, for example, by an ATM rule orchestration module 512.

An ATM monitoring module 514 may be used to monitor the performance of the ATMs.

Interactions between the paired ATMs 522, 524, 526, 528, 530 and the various modules may be recorded in a distributed ledger 516 in accordance with blockchain technology. For example, pairing information, a copy of the base model for swarm intelligence, smart contracts, rules, and other information may be maintained on the distributed ledger 516. A copy of the distributed ledger 516 may be maintained on each ATM and may be maintained at the central entity, such as a bank.

Figure 6:
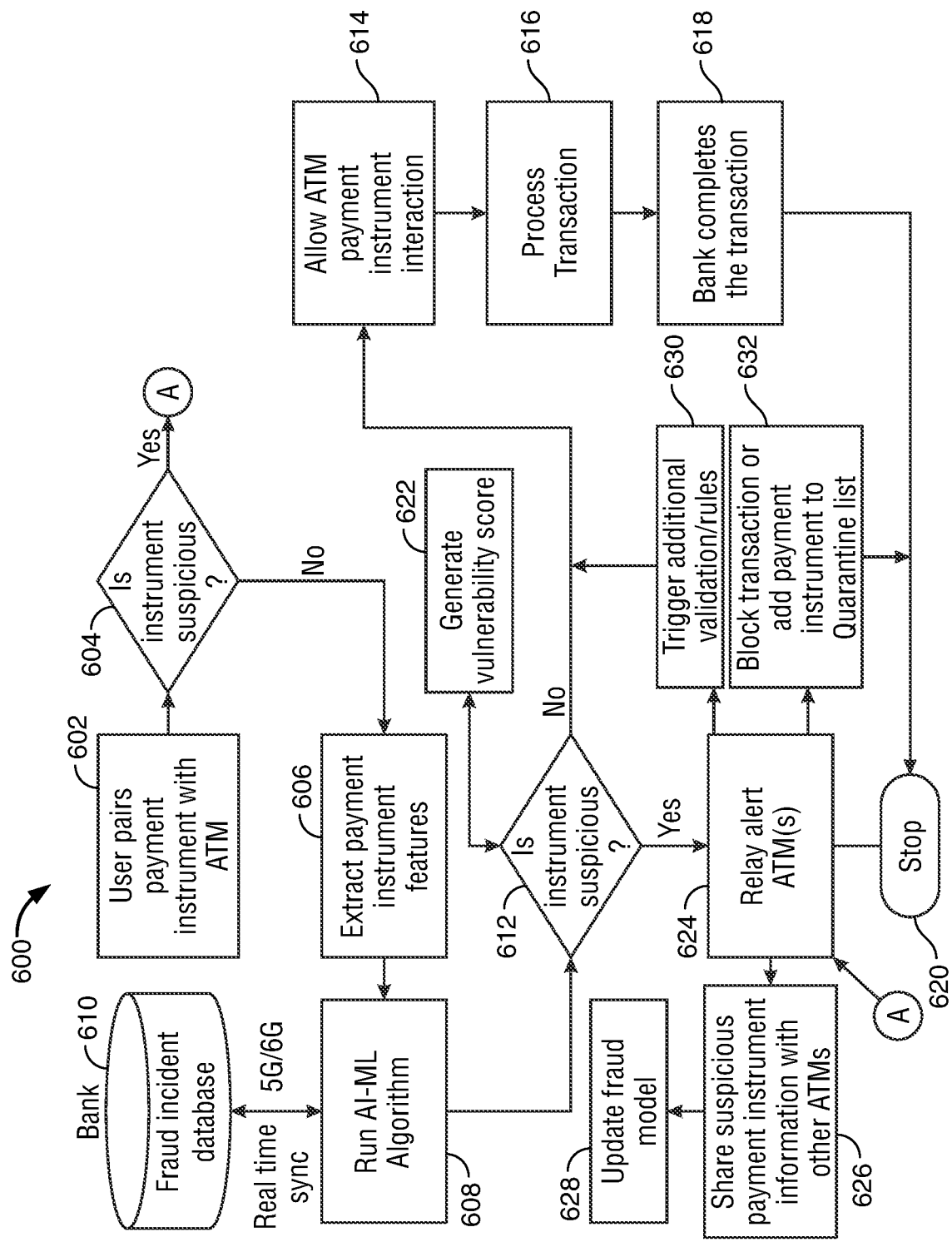
FIG. 6 shows an illustrative flow chart of steps performed upon a customer interaction with an ATM using a payment instrument in accordance with principles of the disclosure.

FIG. 6 shows an illustrative flow chart 600 of steps that may be performed for the decentralized swarm intelligence fraud algorithm in response to a user interaction with the ATM using a payment instrument.

A user may approach an ATM to use a payment instrument. At step 602, the user may attempt to pair the payment instrument with the ATM. The user may be a bank customer, or the user may be someone who is attempting a malicious act, such as tampering with the ATM or committing a fraudulent act.

At step 604, the ATM may determine whether the payment instrument appears to be suspicious based on the swarm intelligence model. For example, the payment instrument may have a unique ID that is captured as part of the login attempt. Swarm intelligence, available at the ATM, may be used to check the ID of the suspicious payment instrument. The ATM may be able to verify the ID itself or may send a request to a paired ATM to verify whether the payment instrument is suspicious. This information may also be available at a centralized fraud incident database but may be more quickly available at the ATMs themselves. As another example, the payment instrument may be of a type, e.g., a particular make and model, that has been known to have caused particular security problems.

If the payment instrument is determined to be suspicious at step 604, at step 624, the attempted use of the suspicious payment instrument may trigger an alert to be relayed from the ATM, such as from a local cache at the ATM, to the other ATMs in the paired ATM network. At step 632, the transaction requested using the suspicious payment instrument may be blocked from accessing the ATM and the payment instrument may be added to a quarantine list for that ATM or for all ATMs depending on the rules specified in a smart contract. Additionally, at step 626, the ATM may share information about the suspicious payment instrument with other ATMs in the paired ATM network and, at step 628, the swarm intelligence model (fraud model), which may be used to identify potential malicious actions or fraud at the ATMs, may be updated.

As an alternative to blocking all interactions by a suspicious payment instrument with an ATM, interactions may be allowed but the transactions that are allowed may be limited. For example, the amount of an allowed cash withdrawal may be limited.

At step 630, the payment instrument that has been identified as suspicious may be given an opportunity to demonstrate that it is not suspicious. For example, the ATM may require that the user enter an additional form of validation/rules, such as to perform a two-factor authentication or answer a security question.

At step 612, the payment instrument may be rechecked to determine whether it is suspicious. In determining whether a payment instrument is suspicious at step 612, the ATM may generate a vulnerability score at step 622 based on the extracted payment instrument features and various security criteria defined in the swarm intelligence model. As an example, if a vulnerability score is determined to be above a threshold, the instrument may be determined to be suspicious and a score below the threshold would result in a determination that the payment instrument is not suspicious. The level of the vulnerability scoring may also be used to decide on what action to take if the payment instrument is determined to be suspicious. For example, if the level of vulnerability score is above the threshold, the ATM may allow limited interactions with the payment instrument where the vulnerability score is relatively low within a range of values above the threshold and may block access to the payment instrument where the vulnerability scoring is relatively high within the range of values above the threshold.

The decision whether to limit or block access to a particular payment instrument and scoring of the vulnerability may depend on the number of times that the payment instrument has been used and the times that the payment instrument has been found to be suspicious on multiple occasions. For example, at the first occurrence, the payment instrument may be given limited access. However, at a second occurrence, the payment instrument may be blocked completely.

The vulnerability score may be specific to a particular ATM. Some ATMs may have a vulnerability to a particular type of attack and some may not have the same vulnerability that may be detected.

At step 614, if the payment instrument is not suspicious, the payment instrument may be allowed to interact with the ATM, the transaction requested by a user may be processed at step 616, and the bank may complete the transaction at step 618. Upon completion of the transaction, the interaction between the payment instrument and the ATM may end, such as at step 620, or another transaction may be requested using the payment instrument.

If the payment instrument is determined to be suspicious at step 604, at step 606, the ATM may extract features of the payment instrument, such as apps or functions available on the payment instrument, and, at step 608, may perform an artificial intelligence/machine learning algorithm, which may be based on a model stored at the ATM. Results of the algorithm may be reported to and synchronized with a fraud incident database 610 at the bank, which may be performed in real time. As described above, at step 612, the ATM may again be checked for suspicious activity based on the extracted payment instrument features. If the payment instrument is not suspicious, the transaction may proceed with steps 614, 616, and 618. If the payment instrument is suspicious, steps 624, 632, 626 and 628 may be performed and step 630 may be repeated for at least a limited number of times.

Thus, flow chart 600 illustrates an example of how an ATM participating in a swarm intelligence algorithm may intelligently detect a suspicious payment instrument that may be attempting a malicious intrusion via a payment instrument interaction with the ATM, take responsive action to prevent and control the attacks in real time, and relay an alert to other ATMs.

Figure 7:
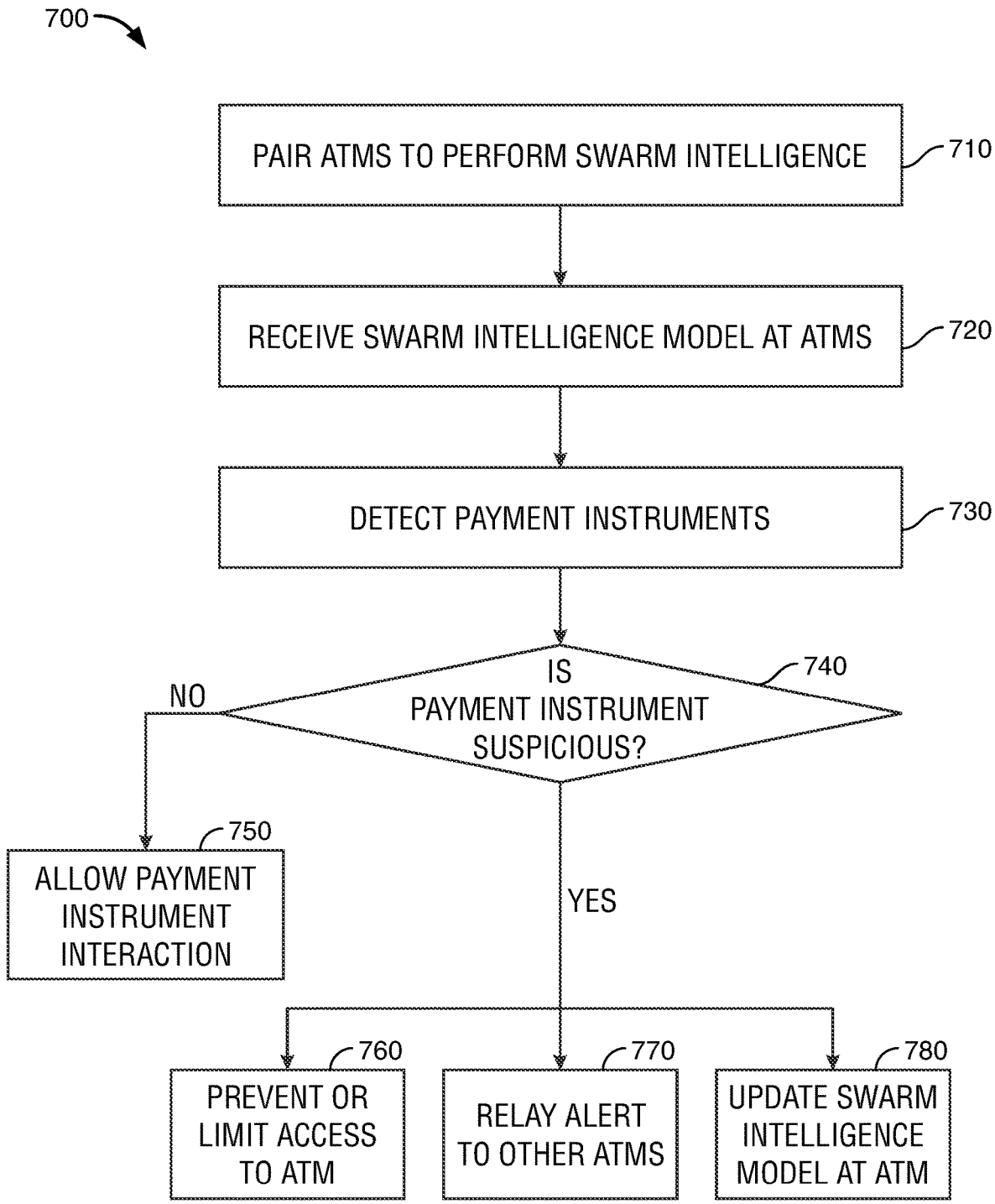
FIG. 7 shows an illustrative flow chart of steps that may be performed by the ATMs using swarm intelligence to control malicious attacks on the ATMs in accordance with principles of the disclosure.

FIG. 7 shows another illustrative flow chart 700 of steps that may be performed by the ATMs using swarm intelligence to control malicious attacks on the ATMs.

At step 710, ATMs may be paired to create a local network. The swarm intelligence may be performed on paired ATMs in the local network. At step 720, a swarm intelligence model may be received at one or more of the ATMs. This model may be an initial or base model to use at the start of the swarm intelligence algorithm being performed over the ATMs. At step 730, a payment instrument used at an ATM may be detected. At step 740, it is determined, by the ATM, whether the payment instrument is suspicious. If the payment instrument is not determined as suspicious, then at step 750, the ATM may permit interactions between the payment instrument and the ATM. If the payment instrument is determined by the ATM to be suspicious, then steps 760, 770 and 780 may be performed. At step 760, the ATM may prevent access to the ATM or may provide only limited access to the ATM. At step 770, the ATM may relay alerts to other paired ATMs. At step 780, the ATM may update its swarm intelligence model to reflect the suspicious instrument. The other ATMs may also update the swarm intelligence models to reflect the alert. An alert may also be transmitted to ATMs outside of the geofenced ATMs.

Figure 8:
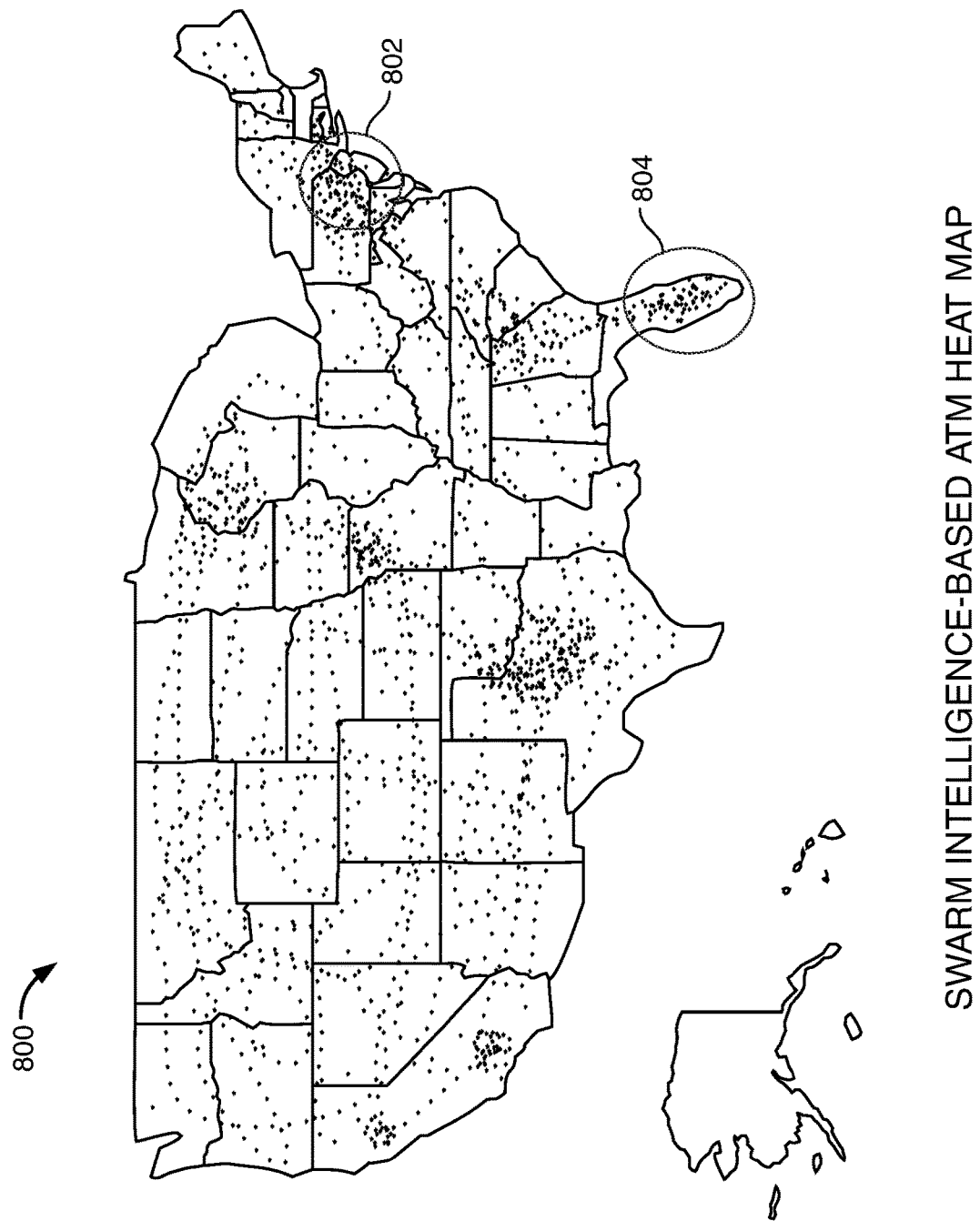
FIG. 8 shows an illustrative example of a swarm intelligence-based heat map that shows how surface attacks to be addressed by the swarm intelligence algorithm may predominate in certain regions in accordance with principles of the disclosure.

FIG. 8 shows an illustrative example of a swarm intelligence-based heat map of the United States in which certain areas of the map show a greater number of malicious attacks on ATMs than other areas on the map. Attacks may predominate in certain areas such as areas 802 and 804. This may be due to various reasons, such as malicious actors targeting particular regions of the country where they might be located, or where they believe that vulnerable ATMs might be concentrated. In embodiments, the ATMs included in a paired ATM network that performs swarm intelligence may be geofenced to be located within a hot region where malicious or fraudulent activities are high, ATMs outside the hot regions may be separately geofenced.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may implement a decentralized swarm intelligence algorithm using a network of paired ATMs to prevent or control surface attacks on ATMs. Persons skilled in the art will appreciate that the present invention can be practiced by other than the described embodiments, which are presented for purposes of illustration rather than of limitation.

What is claimed is:

1. A method for controlling access to an automated teller machine (ATM) upon detection of a suspicious payment instrument, the method comprising:
   pairing a first ATM with a plurality of other ATMs to form a network of paired ATMs that perform banking transactions and serve as distributed nodes for performing a swarm intelligence algorithm, wherein the paired ATMs are accessible using one or more payment instruments that are external to the ATMs;
   receiving, at the first ATM, an initial swarm intelligence model for performing the swarm intelligence algorithm on the network of paired ATMs;
   detecting, by the first ATM, one of the one or more payment instruments used by a user to access the first ATM and capturing information about the payment instrument;
   determining, by the first ATM, whether the detected payment instrument of the user is suspicious based on the initial swarm intelligence model and the captured information;
   allowing, by the first ATM, interaction with the payment instrument when the payment instrument is not determined to be suspicious; and
   when the detected payment instrument of the user is determined to be suspicious:
      executing, by the first ATM, an action to control access to the first ATM by the payment instrument that is determined to be suspicious;
      relaying, by the first ATM, an alert to the plurality of other ATMs about the suspicious payment instrument; and
      updating, at the first ATM, the initial swarm intelligence model to an updated swarm intelligence model that accounts for the determination that the payment instrument is suspicious.

2. The method of claim 1, further comprising:
   receiving, at the plurality of other ATMs, copies of the initial swarm intelligence model, and
   updating the initial swarm intelligence model at one or more of the plurality of other ATMs in the network of paired ATMs upon receiving the alert from the first ATM.

3. The method of claim 1, further comprising:
   transmitting the captured information about the payment instrument about the detection of the suspicious payment instrument to a fraud incident database in communication with the paired ATMs to update the fraud incident database.

4. The method of claim 1, further comprising:
   analyzing, using a neural network, the detected suspicious payment instrument to ascertain any vulnerability of the first ATM to the suspicious payment instrument.

5. The method of claim 1, wherein the paired ATMs are configured to wirelessly communicate with one another over one or more wireless communications networks, and the relaying of the alert to the plurality of other ATMs is performed over the one or more wireless communications networks.

6. The method of claim 1, wherein the relaying of the alert to the plurality of other ATMs is performed by the first ATM using ant colony optimization (ACO).

7. The method of claim 1, wherein the paired ATMs to which the alert is relayed are located within a geofenced area.

8. The method of claim 1, wherein each of the paired ATMs is a blockchain node, the method further comprising:
   updating a distributed ledger upon detection of a suspicious payment instrument received at the first ATM.

9. The method of claim 7, wherein the distributed ledger includes one or more smart contracts that includes rules for one or more of:
   pairing ATMs, performing swarm intelligence using the paired ATMs, updating the swarm intelligence model at each of the paired ATM, transmitting updates of the swarm intelligence model to a fraud incident database, relaying alerts to the paired ATMs, or interacting with a bank.

10. The method of claim 1, wherein the execution of an action to control access to the first ATM comprises one or more of:
    preventing or limiting access to the first ATM, preventing or limiting a requested banking transaction, or requiring an additional step to be performed before executing the requested banking transaction.

11. The method of claim 1, wherein the execution of an action to control access to the first ATM comprises one or more of:
    blocking a user of the suspicious payment instrument, blocking all users of a same type of payment instrument as the suspicious payment instrument, requiring an increased authentication or verification of the suspicious payment instrument before use, limiting an amount or type of a transaction that may be performed by the suspicious payment instrument at the ATM, or placing the user of the suspicious payment instrument on a blacklist.

12. The method of claim 1, further comprising quarantining the first ATM upon detection of the suspicious payment instrument.

13. The method of claim 1, further comprising synchronizing, by the first ATM, the updated swarm intelligence model with a version of a swarm intelligence model for the paired ATMs that is maintained at a fraud incident database and is in communication with the paired ATMs.

14. The method of claim 1, wherein each of the paired ATMs, including the first ATM and the plurality of other ATMs, comprises an edge in an edge network.

15. A system comprising:
    a plurality of automated teller machines (ATMs) that perform banking transactions and collectively control attacks on the ATMs;
    wherein the ATMs are paired to serve as distributed nodes for collectively performing a swarm intelligence algorithm for collecting and sharing information about suspicious payment instruments that have attempted to access the ATMs;
    wherein each of the ATMs comprises:
       an interface for a payment instrument to access a respective ATM for performing a banking transaction;
       a memory for storing an initial swarm intelligence model for performing the swarm intelligence algorithm at the respective ATM; and
       a processor configured to:
          detect, by the respective ATM, a payment instrument used, by one of the users, to access the respective ATM and capture information about the payment instrument;

determine, by the respective ATM, whether the payment instrument is suspicious based on the initial swarm intelligence model;

allow, by the respective ATM, interaction with the payment instrument when the payment instrument is not determined to be suspicious; and when the detected payment instrument is determined to be suspicious:

execute, by the respective ATM, an action to control access to the respective ATM by the payment instrument that is determined to be suspicious;

relay, by the respective ATM, an alert to the plurality of other ATMs about the suspicious payment instrument; and update, at the respective ATM, the initial swarm intelligence model to account for a determination that the payment instrument is suspicious.

16. The system of claim 15, wherein each of the ATMs further comprises a dynamic local cache for relaying alerts in real time to other ATMs in the plurality of ATMs.

17. The system of claim 16, wherein the processor of each of the ATMs is further configured to relay the real-time alerts based on an ant colony optimization.

18. The system of claim 15, wherein each of the ATMs comprises a wireless communications transceiver to communicate with one another wirelessly.

19. The system of claim 15, wherein each of the ATMs operates as a blockchain node, and wherein the ATMs use a distributed ledger to capture a record of interactions between the ATMs.

20. The system of claim 15, further comprising a fraud incident database in communication with the ATMs that is periodically synchronized with the swarm intelligence algorithm operating on the ATMs.

21. The system of claim 15, further comprising a neural network in communication with the ATMs to analyze the suspicious payment instruments that are received at the ATMs.

22. The system of claim 15, further comprising one or more modules that are configured to perform one or more of the following:

initiating the pairing of the ATMs;
generating the initial swarm intelligence model;
monitoring operations of the ATMs;
validating payment instruments;
orchestrating a decentralized control of respective local caches at each of the ATMs to detect fraud;
controlling the relay of alerts by the respective local caches to use ant colony optimization for distribution of the alerts;
generating and modifying smart contracts that control operations of the swarm intelligence algorithm; or
orchestrating rules to be used at the plurality of ATMs.

23. A method for controlling access to an automated teller machine (ATM) upon detection of a suspicious payment instrument, the method comprising:

implementing a swarm intelligence algorithm on a network of ATMs, wherein the ATMs serve as distributed nodes for performing the swarm intelligence algorithm, wherein each of the ATMs may be accessed using one or more payment instruments that are external to the ATMs, and wherein each of the ATMs receives an initial swarm intelligence model for performing the swarm intelligence algorithm;

detecting, by a first ATM of the network of ATMs, one of the one or more payment instruments used by a user to access the first ATM and capturing information about the payment instrument;

determining, by the first ATM, whether the detected payment instrument of the user is suspicious based on the initial swarm intelligence model and the captured information;

allowing, by the first ATM, interaction with the payment instrument when the payment instrument is not determined to be suspicious; and when the detected payment instrument of the user is determined to be suspicious:

executing, by the first ATM, an action to control access to the first ATM by the payment instrument that is determined to be suspicious;

relaying, by the first ATM, an alert about the suspicious payment instrument to other ATMs in the network of ATMs, wherein the alert includes captured information about the payment instrument; and updating, at the first ATM, the initial swarm intelligence model to an updated swarm intelligence model that accounts for the determination that the payment instrument is suspicious, the captured information about the payment instrument.

* * * * *